Figure 1:
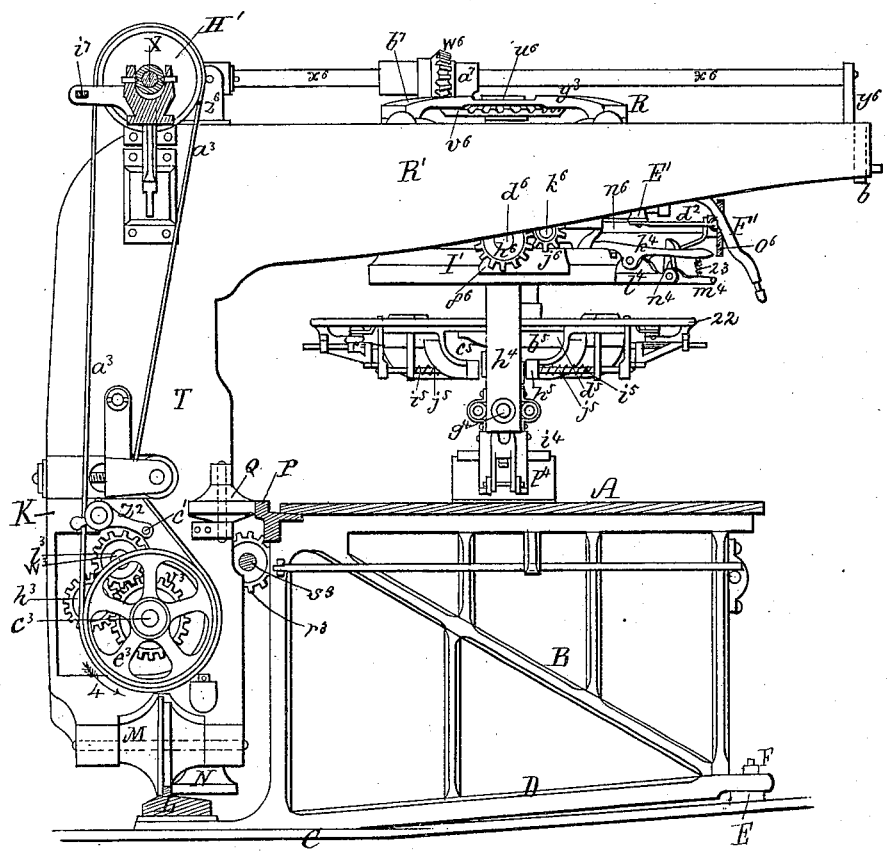

(Model.)

F. A. LOCKWOOD.

MACHINE FOR SCOURING, SETTING, OR GLASSING LEATHER.

No. 258,659. Patented May 30, 1882.

7 Sheets—Sheet 1.

Reduced.

Witnesses

Inventor.
Frederic A. Lockwood.
F. Curtis, Atty.

(Model.)

F. A. LOCKWOOD.
MACHINE FOR SCOURING, SETTING, OR GLASSING LEATHER.

No. 258,659. Patented May 30, 1882.

7 Sheets—Sheet 2.

Reduced Scale.

Witnesses:

Inventor:
Frederic Lockwood.

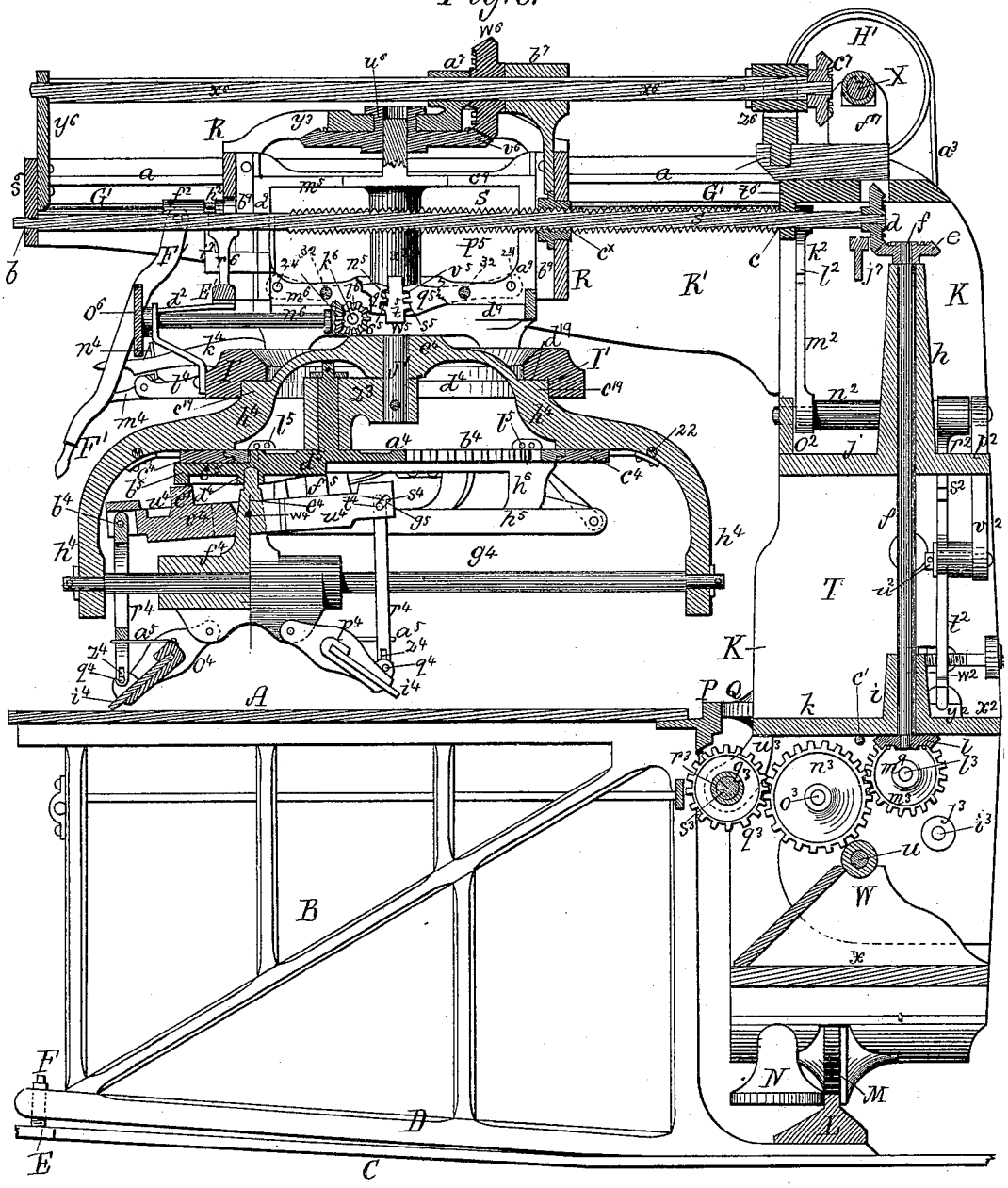

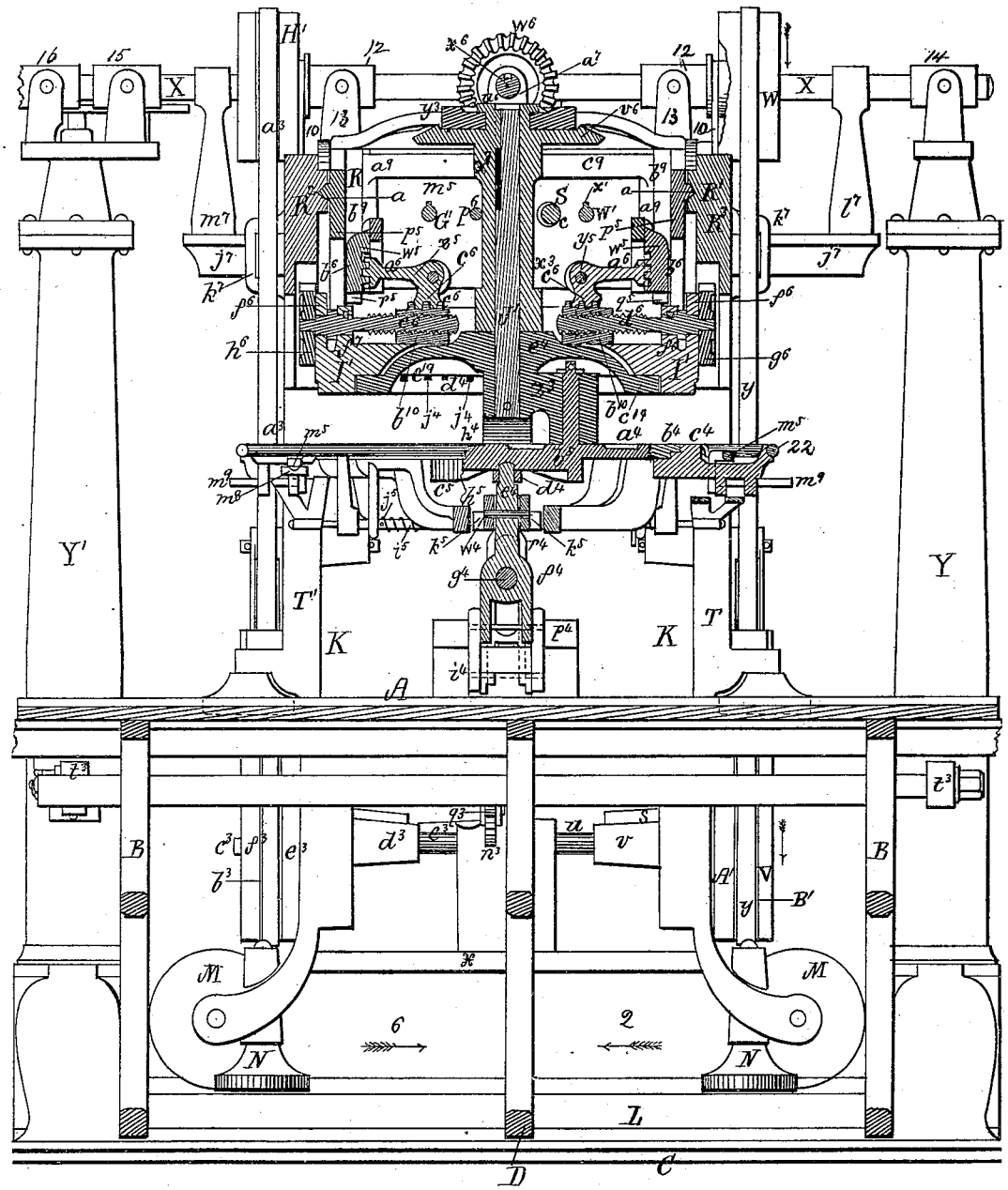

(Model.)

7 Sheets—Sheet 5.

F. A. LOCKWOOD.
MACHINE FOR SCOURING, SETTING, OR GLASSING LEATHER.

No. 258,659.

Patented May 30, 1882.

Reduced.

(Model.) 7 Sheets—Sheet 6.
F. A. LOCKWOOD.
MACHINE FOR SCOURING, SETTING, OR GLASSING LEATHER.
No. 258,659. Patented May 30, 1882.
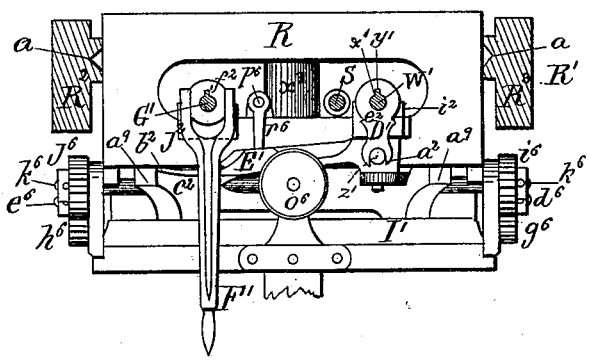
Fig. 6.
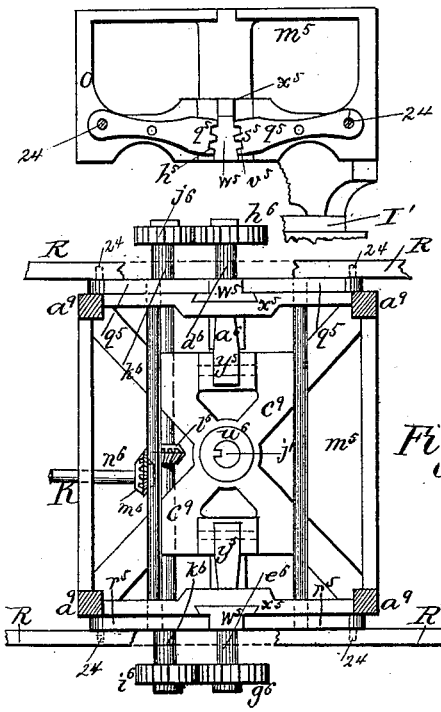
Fig. 7.
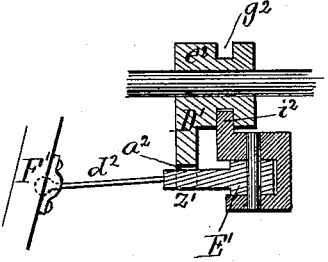
Fig. 19.
Fig. 8.
Witnesses.
Inventor.
Frederic A. Lockood
J. Curtis, Atty.

(Model.)
F. A. LOCKWOOD.
MACHINE FOR SCOURING, SETTING, OR GLASSING LEATHER.
No. 258,659.  Patented May 30, 1882.
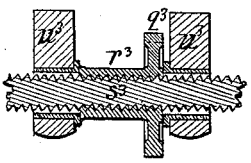
Fig. 9.
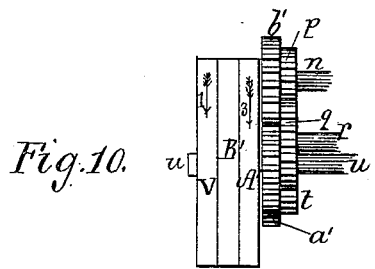
Fig. 10. Fig. 14.
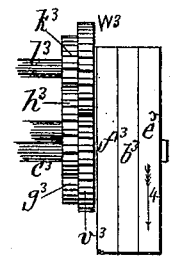
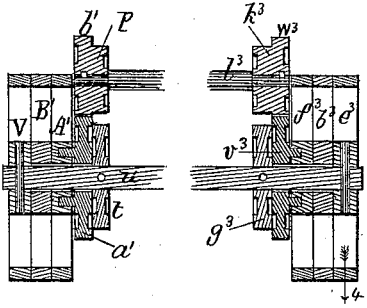
Fig. 11. Fig. 15.
on line a.b. of Fig.12.  on line a.b. of Fig.16.
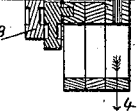
Fig. 12.  Fig. 18.  Fig. 16.
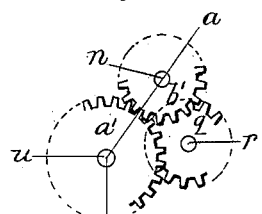 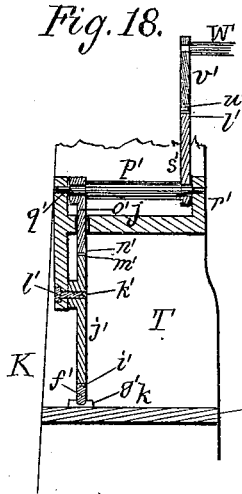 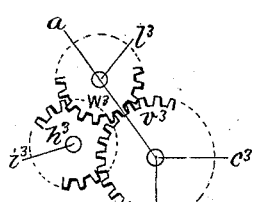
Fig. 13.  Fig. 17.
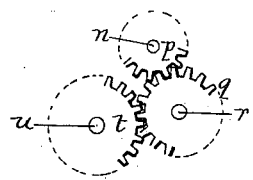 
Witnesses:  Inventor
  Frederic A. Lockwood.
  F. Curtis. Atty.

UNITED STATES PATENT OFFICE.

FREDERIC A. LOCKWOOD, OF BOSTON, MASSACHUSETTS.

MACHINE FOR SCOURING, SETTING, OR GLASSING LEATHER.

SPECIFICATION forming part of Letters Patent No. 258,659, dated May 30, 1882.

Application filed June 24, 1881. (Model.)

*To all whom it may concern:*

Be it known that I, FREDERIC A. LOCKWOOD, a citizen of the United States, residing at Boston, in the county of Suffolk and State of Massachusetts, have invented certain new and useful Improvements in Machines for Scouring, Setting, or Glassing Leather or Beaming Hides; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention is an improvement on the machine represented in the United States Letters Patent No. 179,928, granted to me July 18, 1876, to which reference may be had.

In devising my present improvements I have had primary objects in view, first, to drive the operative parts of the machine by direct positive mechanical devices in lieu of a belt, thereby insuring uniform and certain actions of the various agencies and reducing the power required to run the machine; and, second, to relieve the attendant to a great extent of the constant care and watchfulness heretofore devolving upon him, and enable the main functions of the machine to be controlled by a single hand or guide lever.

In my patent referred to the beam, or that part of the truck extended horizontally over the skin-supporting table, was made vertically movable in the main part of the truck, and the so-called "cross-head" or carriage was made horizontally movable on ways of the said beam. Such construction was objectionable for the reason that the said beam had to be lifted when the dressing-tools were lifted, and also because of the lack of rigidity at the junction of the beam-arms and truck. To obviate these difficulties I have made the beam-arms as a fixed part of the truck, and I have divided the so-called "cross-head" or carriage into two parts, one of which I herein denominate as the "trundle-frame" and the other as the "head." This head I have made vertically adjustable with relation to the horizontally-movable trundle-frame, and I have mounted in this head the axially-movable yoke common to my said patent, the said yoke having upon it the guide-rod which receives the reciprocating tool-carrier. The head in this my present invention is made vertically adjustable by means of a hand-operated shaft located at the front of the machine, and such adjustment may be made during the operation of the machine. In my present invention the truck is made movable longitudinally with relation to the skin-supporting table by means of a rotating nut placed on a screw-threaded rod held in a fixed part of the frame-work of the machine. This nut may be rotated in one or the other direction on the said rod, and the ends of the nut acting against the truck to move the same longitudinally. This nut and screw enables me to move the truck positively in both directions and hold the truck firmly in place, thus dispensing with pawls and their actuating mechanism.

In my former patent the movable parts of the machine were actuated by a single long belt extended about several active and idle pulleys, which is objectionable because of unsteady movement, great consumption of power resulting from friction, and the slipping and stretching of the belt. To obviate these difficulties I have devised a system of shafting and gearing by which I am enabled to drive the operating parts of the machine positively.

In my former patent I have two hand-levers, one to control the movement of the truck on its ways and the other the movement of the so-called "cross-head" and carriage; and to effect an oblique movement of the said cross-head with relation to the table it was necessary to move both levers simultaneously, which was very difficult, so I have herein shown a mechanical organization whereby either or all the said movements derived by the movement of the truck on its rails and of the carriage on the track may be controlled by a single lever.

I have herein shown the carriage as driven positively by means of a rotating screw, as will be hereinafter described.

Figure 2:
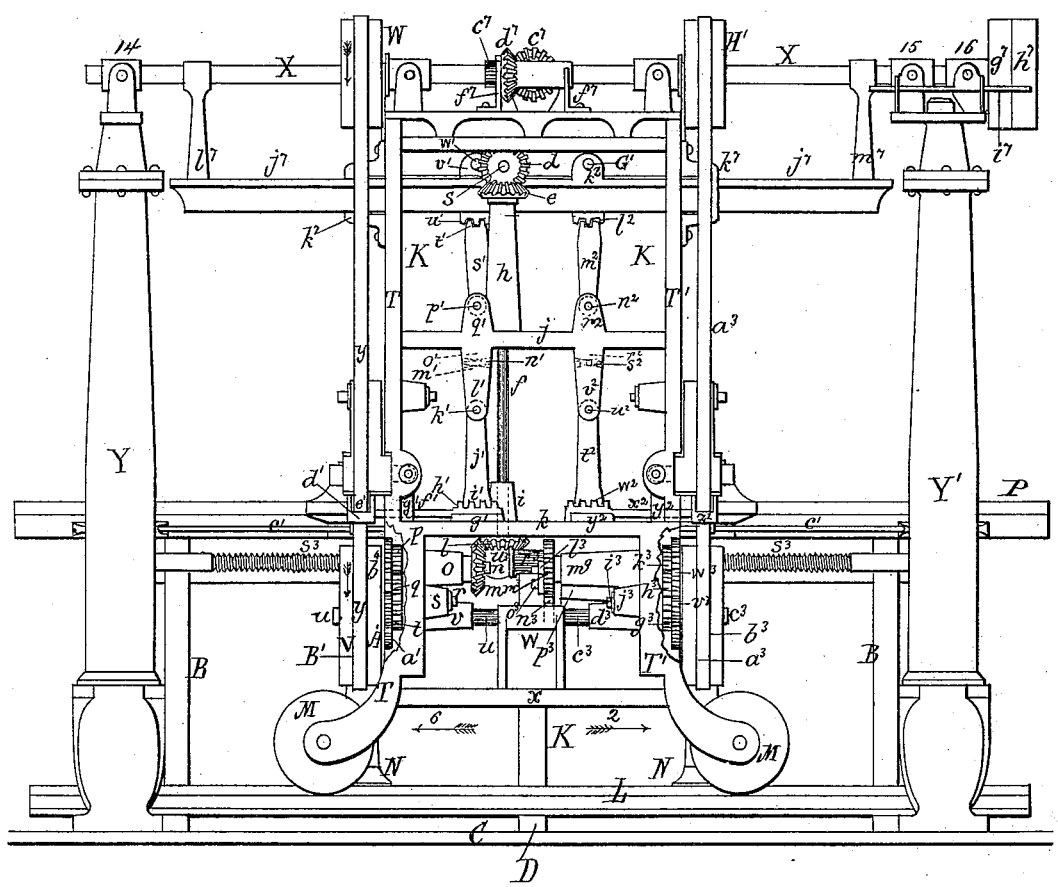
Figure 20:
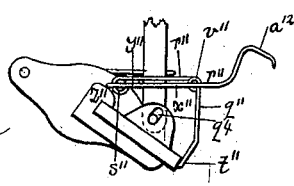
Figure 5:
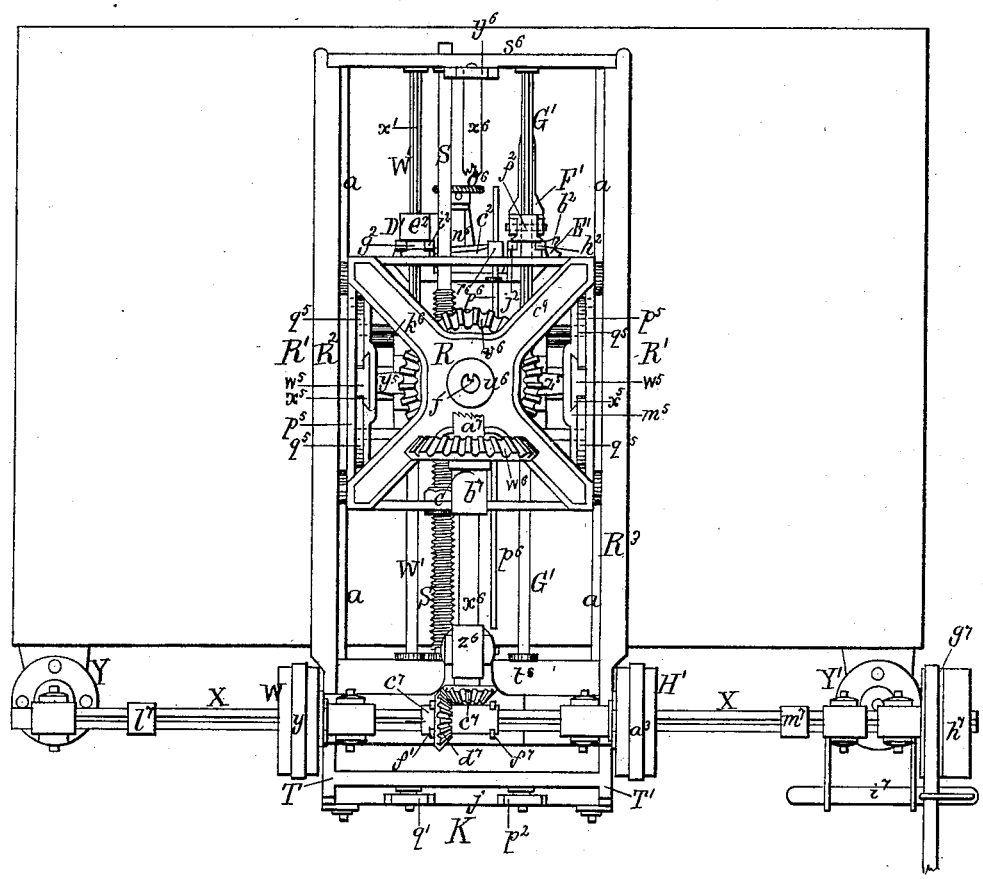

In the drawings accompanying this specification, Figure 1 is a side elevation of a machine containing my improvements. Fig. 2 is a rear elevation of the same. Fig. 3 is a vertical and longitudinal section of the same. Fig. 4 is a vertical transverse section of the same. Fig. 5 is a plan of the same. Fig. 6 is a detail in front view of the carriage and some of its attached parts. Fig. 7 is a side view of the head of the carriage with its attached lifting-levers. Fig. 8 is a detail in plan showing the head of the carriage and means for lifting it, the said figure also showing part of the trundle-frame of the carriage. Fig. 9 is a section of the screw-threaded nut or sleeve and screw-shaft which in part effects the movement of the truck. Fig. 10 is an edge elevation, Fig. 11 a section, and Figs. 12 and 13 side views, of the pulleys and gears making part of the mechanism for operating the screw which feeds the trundle-frame and its accessories. Fig. 14 is an edge elevation, Fig. 15 a section, and Figs. 16 and 17 side views, of the pulleys and gears making part of the mechanism for operating the truck. Fig. 18 is a detail showing part of the means for shipping the belts which control the movements of the carriage and truck. Fig. 19 is a section of the bell-crank lever which rocks the shaft that puts the truck in motion. Fig. 20 shows the scraper and mechanism for cleaning the same.

Reference being had to the above-mentioned drawings, it will be seen that A represents a horizontal table of a size to receive one or more skins, as occasion may demand, as, owing to the great range and freedom of movement of my tool-carrier, I am not confined within arbitrary bounds, but am enabled to treat two or more skins upon one table by changing the position of the machine with relation to the skin-supporting table, so that while one skin is being manipulated the finished one may be removed and a fresh one substituted, by which means I avoid the loss of time heretofore incident to the cessation of the functions of the machine while a skin is thus being removed and another supplied.

The table A is supported upon a stage, B, which is erected upon the floor C of the apartment or the foundation of the machine, whatever the latter may be; and as I have made provision for leveling the table A, or adjusting it to sloping or irregular floors or foundations, I have in the accompanying drawings represented the said floor as sloping and depressed at rear, which is desirable in order that refuse water and liquids may pass off.

To compensate for the inclination or irregularities of the floor C, I prefer to dispose the front ends of the lower beams, D, of the stage B upon metallic blocks, and screw through the said ends of the beam screws to bear upon said blocks, by which means the irregularities or inclination of the floor is overcome.

In the rear of the table A, I dispose an upright truck, K, whose movements are guided by a horizontal rail, L, secured to the rear ends of the beams D and parallel to the edge of the said table. Wheels M are interposed between the truck K and rail L to reduce friction, while a second series of rollers, N, are pivoted to the feet of the truck and roll upon or against the front edge of the said rail, and serve as rolling bearings to retain the wheels M in place upon the rail L and overcome the great friction incident to the leverage of the truck over the upper rail, P, (see Fig. 3,) as a fulcrum. I pivot to the adjacent parts of the truck anti-friction rollers Q, which travel against the rear edge of the ledge or upper rail, P.

The trundle-frame R of the carriage $m$ (shown in Figs. 1, 3, 4, 5, 6, and 8) is placed between the side pieces, $R^2 R^3$, of the horizontal beam R′ of the truck, and has V-shaped bearings to fit correspondingly-shaped grooves $a$ in the said side pieces. The carriage, composed of the trundle-frame R and vertically-adjustable head $m^5$, to be hereinafter described, is moved longitudinally with relation to the said beam R′ and transversely of the table by means of a screw-threaded shaft, S, (see Fig. 3,) held in suitable bearings, $b\,c$, the said screw fitting a threaded nut, $c^x$, fixed to the rear part of the trundle-frame of the carriage. The screw-shaft S is rotated by a beveled gear, $d$, fixed to its rear end, which beveled gear is engaged and driven by a second beveled gear, $e$, secured to the upper end of a vertical shaft, $f$, which is supported in bearings $h\,i$, erected on bars $j\,k$, which unite the side plates or housing, T T′, of the truck K.

To the lower end of shaft $f$ is secured a bevel-gear, $l$, which is engaged and driven by a bevel-gear, $m$, (see Fig. 2,) fixed to the inner end of a short horizontal shaft, $n$, supported in a bearing, $o$, extended inward from the side plate, T. The shaft $n$, outside the said housing, has affixed to it a spur-gear, $p$, (see Figs. 2, 10, 11, 12, 13, and 18,) which in its turn is engaged by an intermediate spur-gear, $q$, mounted loosely on the outer end of a short horizontal shaft, $r$, supported in a bearing, $s$, projecting laterally inward from the housing T alongside the bearing $o$, before named, the latter gear, $q$, being engaged by a spur-gear, $t$, fixed to a horizontal shaft, $u$, which is supported in part in a bearing, $v$, projecting laterally inward from the housing T in front of the bearings $o\,s$, and at its inner end in a bearing, $w$, erected upon the bottom bar, $x$, of the truck K.

The driving-pulley V, fixed to the outer end of the shaft $u$, is adapted to be driven by a band, $y$, passed about it from the pulley W, splined upon the main driven shaft X, having usual fast and loose pulleys, $h^7 g^7$. The hub of pulley W is provided with an annular groove, which is embraced by a fork, 10, and the said hub is connected with the bearing-sleeve 12, pivoted upon a standard, 13, rising from the truck K. The pulley H′, to be hereinafter referred to, is constructed and mounted in like manner, and as the truck is moved horizontally the said sleeves are moved longitudinally upon the shaft X and move the said pulleys with them. The shaft X has other bearings, 14 15 16, pivoted, as herein shown, at the upper ends of the fixed upright columns Y Y′.

Rotation of the pulley V in the proper direction—that is, as shown by its arrow 1 in Fig.

10 of the drawings—has the effect, through the agency of the spur-gears $p$ $q$ and $t$ and bevel-gears $d$, $e$, $l$, and $m$, to rotate the screw-shaft S in such a direction as to cause the trundle-frame R of the carriage and its connected parts to move longitudinally in one direction²—that is, outward upon the beam R'—while to effect the movement of the frame of the carriage upon said beam in the opposite or inward direction I mount loosely upon the shaft $u$, inside of the pulley V, a second driving-pulley, A', of equal size with the first, and to adapt this pulley A' to rotate such shaft I secure to the latter, outside of the gear $t$, a spur-gear, $a'$, which engages a spur-gear, $b'$, fixed to the outer extremity of the shaft $n$ outside of the gear $p$, before named, and secured to and revolving with the latter. An idle-pulley, B', loosely incloses the shaft $u$ between the fast pulleys V A', and when the belt $y$ is upon this loose pulley B' the carriage remains stationary. When the belt $y$ is driving the pulley A' in the direction of its arrows 3, and by the latter effecting the inward movement of the carriage, the pulley V and shaft $u$, with the gears $q$ and $t$ and shaft $u$, rotate in opposite directions without effect upon the shaft $n$ and screw-shaft S, said pulley V and shaft $u$ being put in motion at this time by the gear $p$ acting upon the gear $t$ through the intermediate gear, $q$. When the pulley V is the active one and driving the shafts $f$ and S, and the pulley A' is idle, the latter revolves in the opposite direction loosely about the shaft $u$ by the action of the gear $b'$ upon the gear $a'$.

The pulley W is sufficiently wide to permit of the shifting of the band $y$ from the pulley V to the pulley A', and vice versa, and to effect this shifting of the band I employ an arm, $d'$, (see Fig. 2,) which, at its rear end, is forked and straddles the band.

To the forked end of the shipper-arm $d'$, I secure the outer end of a horizontal slide-bar, $f'$, (see Fig. 2,) which extends through the housing T and is supported in bearings $g'$ in the top of the shelf $k$, before named, and upon the upper inner part of this bar $f'$, I cut a toothed rack, $h'$, which engages a similar rack, $i'$, cut upon the lower end of a vertical sectoral plate or arm, $j'$, which is pivoted and oscillates upon a horizontal pivot, $k'$, secured to a hanger, $l'$, depending from the rear part of the shelf $j$ above, while upon the upper end of the sectoral plate $j'$ is cut a toothed rack, $m'$, which engages a similar rack, $n'$, cut upon the lower end of a second sectoral plate, $o'$, (see Figs. 2 and 18 of the drawings,) which is secured at its upper end to the rear end of a horizontal rock-shaft, $p'$, mounted in bearings $q'$ $r'$, erected upon opposite edges of the said shelf $j$. Furthermore, to the front end of the rock-shaft $p'$, I secure the lower end of a third vibrating sectoral plate or arm, $s'$, upon the upper end of which I cut a toothed rack, $t'$, that engages a similar rack, $u'$, cut upon the lower end of a fourth vibrating sectoral plate, $v'$, which in turn is secured at its upper end to the rear extremity of a long horizontal rock-shaft, W', disposed within the upper part of the beam R', and supported in bearings in each end of the latter. A rocking of the rock-shaft W' in one or the other direction effects, through the agency of the sectoral plates $j'$ $o'$ $s'$ $v'$ and shaft $p'$, lateral movements of the shipper-bar $f'$, and consequent shifting of the band $y$ from the pulley V to the pulley A', or vice versa, or to the central idle-pulley, B', and to enable the rocking of said shaft W', and consequent shifting of the band, to be effected from the front of the machine, I employ a pendent rocker-arm, D', (see Figs. 6 and 19,) which loosely encompasses the front end of said shaft W', and is adapted to slide freely upon the latter, but is prevented from rotating upon it by a spline, $x'$, upon the said shaft, which enters a groove, $y'$, in the head $e^2$ of the said arm, while to effect the requisite vibrations of the latter I employ a horizontal bell-crank lever, E', which is pivoted at its angle to the front lower part of the trundle-frame, and with the nose of its shorter arm $z'$ (which latter is parallel with the axis of the rock-shaft W') entering a fork, $a^2$, in the lower end of said arm D'. The opposite and free end $b^2$ of the arm $c^2$ of the lever E' is connected by a link and ball-and-socket joint, $d^2$, (see Fig. 19,) with a pendent guide-lever, F', which is pivoted at its upper end to a tubular hub, $f^2$, (see Fig. 6,) that encompasses and slides longitudinally upon a long rock-shaft, G', which is guided in bearings in opposite ends of the beam R' in manner similar to the rock-shaft W', the shaft G' being a companion to the shaft W', and being parallel to and preferably in the same horizontal plane with the latter.

I prefer, for convenience in certain respects, that the guide-lever F' shall move with the carriage. To accomplish this I provide the head or hub $e^2$ of the rocker-arm D' and of the rocker-hub $f^2$, to which the guide-lever F' is attached, with a peripheral groove, $g^2$ or $h^2$, (see Fig. 5,) and secure to the adjacent part of the trundle-frame of the carriage forked uprights $i^2$ or $j^2$, which enter these grooves, thereby permitting of lateral rocking motions of the rock-shafts W' and G' by the corresponding movements of the guide-lever, and of sliding movements of the rocker-hub $e^2$ $f^2$ longitudinally upon such shafts by and with the trundle-frame of the carriage. It will thus be seen that an extreme outward or forward movement of the guide-lever F' in alignment with the axis of the shaft W' or G' effects by means of the bent lever E' a rocking movement of the rock-shaft W' and a shipping of the belt $y$ from the idle-pulley B' to the fast pulley V, while a reverse or rearward extreme movement or vibration of such lever F' effects a reverse rocking of said shaft W' and a shipping of the belt from V to B', it being understood that the idle or neutral position of the said guide-lever with respect to the rock-shaft W' is a mean between its extremes of vibration longitudinally of said shaft, and when in this position it maintains the belt upon the idle-pulley B'.

To move the truck K and its attached parts longitudinally with relation to the table by the guide-lever F', I have provided devices which I will now describe.

To the rear end of the rock-shaft G' (see Figs. 2 and 3) I secure a pendent sectoral arm, $k^2$, upon the lower edge of which I cut a toothed rack, $l^2$, which engages a similar rack cut upon the upper end of a second sectoral plate, $m^2$, which in turn is secured at its lower end to the front end of a horizontal rock-shaft, $n^2$, mounted in uprights $o^2$ $p^2$, erected upon opposite sides of the shelf or bar $j$, before named, while to the front end of said rock-shaft $n^2$, I secure the upper end of a third sectoral plate, $r^2$, upon the lower end of which latter I cut a toothed rack, $s^2$, that engages a similar rack cut upon the upper end of an oscillating arm or fourth sectoral plate, $t^2$, which is pivoted on a stud, $u^2$, to the front side of a hanger, $v^2$, depending from the rear side of the shelf $j$, the lower end of this oscillating arm $t^2$ having a toothed rack, $w^2$, that engages a similar rack cut upon the upper edge of a horizontal slide-bar, $x^2$, which slides within bearings $y^2$ upon the top of the shelf $k$, before named, the said slide-bar extending through the adjacent housing, T', of the truck and being secured to the rear end of a shipper-arm, $z^2$, which in turn is secured at its front end to the horizontal stop-motion rod $c'$, before named, this rod sliding in bearings in the lower part of the truck, as will be hereinafter described.

The shaft G', sectoral arms $k^2$, $m^2$, $r^2$, and $t^2$, rock-shaft $n^2$, slide-bar $x^2$, and shipper-arm $z^2$ are duplicates of like parts upon the opposite side of the truck, as hereinbefore described, except that the rod $c'$ does not actuate the forked arm $d'$.

Upon the main shaft X, outside of the housing T', is secured a pulley, H', and about this pulley is passed a band, $a^3$, (see Figs. 2, 3, 14, 15, 16, and 17,) which is also passed about an idle-pulley, $b^3$, which loosely encompasses a horizontal shaft, $c^3$, supported in bearings $d^3$, projecting laterally inward from the lower part of the housing T', this shaft $c^3$ being in alignment with the shaft $u$, before named, and having its inner end stepped in the same standard, $w$.

To the extreme outer end of the shaft $c^3$, and outside of the idle-pulley $b^3$, is affixed a driving-pulley, $e^3$, while upon the inside of the said idle-pulley $b^3$, I mount loosely upon the same shaft a driving-pulley, $f^3$.

To the shaft $c^3$, immediately outside of the housing T', I secure a spur-gear, $g^3$. While engaging this gear I employ an intermediate spur-gear, $h^3$, which is placed loosely on the outer end of a short horizontal shaft, $i^3$, mounted in bearings $j^3$ projecting inward from the housing T'; and engaging this last gear is a third gear, $k^3$, which is secured to the outer end of a second short horizontal shaft, $l^3$, mounted in bearings $m^3$, extending inward from the housing T' above the shaft $i^3$. The inner end of this shaft $l^3$ is extended inward to the center of the truck, and has affixed to it a spur-gear, $m^3$, which engages an intermediate spur-gear, $n^3$, placed loosely on the inner end of a third short horizontal shaft, $o^3$, mounted in bearings $p^3$, projecting inward from the housing T' in front of the shaft $l^3$. This last-named gear, $n^3$, in its turn engages a spur-gear, $q^3$, secured to or making part of a nut, $r^3$, placed upon and engaging the threads of a long screw-threaded rod, $s^3$, fixed at its ends in brackets $t^3$ $t^3$, projecting outward from the columns Y Y', and immediately in rear of and below the table of the machine. The nut $r^3$ (see Figs. 2, 3, and 9) is confined between hangers $u^3$ $u^3$, depending from the front part of the shelf $k$ of the truck. Consequently rotation of the said nut on the stationary screw-threaded rod $s^3$ causes the truck to be moved on the rails L and P in one or the other direction, according to the direction in which the nut is turned.

Revolutions of the pulley $e^3$ in the direction of its arrow 4, shaft $c^3$, gears $g^3$, $h^3$, $k^3$, $m^3$, $n^3$, and $q^3$ effect by means of the nut $r^3$ and screw-rod $s^3$ the movement of the truck in one direction upon its rails L and P—that is, in the direction of the arrow 2 in Figs. 2 and 4 of the drawings. To effect the opposite movement of the truck upon its supporting-rails—that is, in the direction of arrow 6 in said Figs. 2 and 4—I affix to the inside of the inner pulley, $f^3$, a spur-gear, $v^3$, which engages a spur-gear, $w^3$, secured to the outer end of the shaft $l^3$, before named. Revolutions of the pulley $f^3$ effect, through the gears $v^3$ $w^3$, rotations of the nut $r^3$ in a direction opposite to that first described. Hence the truck is moved in the direction of its arrow 6, (see Figs. 2 and 4 of the drawings,) the pulley $e^3$ and the gears $g^3$, $h^3$, and $k^3$ rotating at the same time in opposite directions without effect upon the nut $r^3$.

The arrangements of the pulleys $b^3$, $e^3$, and $f^3$ and the gears $g^3$, $h^3$, $k^3$, $v^3$, and $w^3$ are the same as the corresponding parts upon the opposite side of the truck, but are devoted to moving the truck upon its rail, while the opposite ones aid in moving the trundle-frame of the carriage upon its ways or guides in the beam R'.

A rocking movement of the shaft G' to the extreme in one or the other direction effects, through the agency of the sectoral arms $k^2$, $m^2$, $r^2$, and $t^2$, rock-shaft $n^2$, slide-bar $x^2$, and shipper-arm $z^2$, as before explained, the shifting of the band $a^3$ from one to the other of the pulleys $e^3$ $f^3$; also effects corresponding movements of the truck longitudinally of the table; and to effect the requisite rocking movements of said shaft G' the guide-lever F' is to be vibrated laterally only. To maintain the truck and the carriage at rest the position of the guide-lever F' is a mean between its extremes of vibration. To enable the truck to be stopped automatically as it arrives at the end of the rails, should the attendant fail to do so, the stop-motion rod $c'$ is of such a length that when the truck reaches the extreme of its movements the rod abuts against the adjacent column, $Y'$ or $Y$, and, being fixed to shipper-arm $z^2$, shifts the belt $a^3$ to the idle-pulley $b^3$.

The tool-carrier $f$, the guide-rod $g^4$, on which it is reciprocated, and the yoke $h^4$, common to my said patent, are supported by the head $m^5$ of the carriage, the said head being composed of an annular horizontal plate, $I'$, upon which are erected posts $a^9$ $a^9$, &c., that slide vertically in guides $b^9$, &c., in the corners of the trundle-frame, the upper and lower ends of these posts being united by cross-bars $c^9$ $c^9$, &c., $d^9$ $d^9$, &c., which in turn are united by a central tubular hub, $x^3$, which surrounds a vertical shaft, $J'$, the upper end of this shaft being contained within the hub of a spur-gear, $v^6$, to be hereinafter described, such gear being compelled to rotate with the shaft by a spline-and-groove connection between the two, and being supported in an arched cross-head or bridge, $y^3$, which constitutes the top of the trundle-frame, the said shaft $J'$ following the vertical movements of the carriage-head $m^5$. The vertical movements of this carriage and its attached parts in the trundle-frame, produced as will be hereinafter described, enable me to fix the beam $R'$ rigidly to the truck, thus gaining greater ease and steadiness of motion, and consequently a nicer degree of accuracy in the working of the usual tools of the tool-carrier.

To the lower end of shaft $J$ is fixed a crank, $z^3$, which embraces (see Fig. 3) a fixed central stud of a gear, $a^4$, constituting an epicycle, which travels within and engages the teeth of an epicycloidal wheel, $b^4$, upheld by a ring, $c^4$, connected with the yoke $h^4$, provided with an annular portion, $c^{19}$, which enters a rabbet, $d^{19}$, at the under side of an annular portion, $I'$, of the head of the carriage. The yoke $h^4$ has a central hub, $e^4$, which surrounds the shaft $J'$. The yoke and its attached parts rise and fall with the head of the carriage, and at the same time rotate within the said head. The gear $a^4$, at its under side, has a stud or wrist-pin, $d^4$, which engages the upper end of a stud, $e^4$, of the tool-carrier $f^4$, adapted to slide upon the guide-rod $g^4$, held by the said yoke.

The epicycloidal gearing herein described and shown operates continuously, but reciprocates the tool-carrier with its tool upon the guide-rod $g^4$ only while the guide-rod and the yoke $h^4$ are held or locked firmly, the direction of the right-line reciprocations of the said tool-carrier depending upon the direction of the guide $g^4$. In practice the yoke $h^4$ is provided with a suitable hand-wheel, 22, (see Figs. 1, 3, and 4,) by which the yoke may be moved axially by the operation to place the guide-rod in the desired direction; but should the operator fail to lock the yoke $h^4$ in position or hold it firmly by the said hand-wheel the said yoke and its guide-rod, with its hand-wheel, would be rotated continuously by the shaft $J'$ and the epicycle $a^4$ without reciprocating the tool-carrier. The annular portion $c^{19}$ of the yoke is provided with a series of notches, $j^4$, (see Fig. 4,) engaged by a suitable latch, $k^4$, pivoted upon a horizontal ear, $l^4$, of the plate $l'$ of the head of the carriage, the said latch locking the yoke in position. When it is desired to change the direction of the guide-bar the latch $k^4$ is disengaged from the notched portion $c^9$ of the yoke, and is held by the pivoted catch $m^4$, acted upon by spring 23. (See Fig. 1.)

When the strokes of the tools are to be repeated several times in the same direction the handle of the catch is raised and that of the latch elevated by the spring 23, interposed between the two, the nose of the latch being thereby forced into one of the notches $j^4$, before named, and the yoke, with the hand-wheel, is thus locked to the annular plate $I'$ of the head of the carriage. My object in thus locking the yoke and hand-wheel is to relieve the attendant from the manual labor of holding the guide-bar $g^4$ in a fixed position, which is essential to impart rectilinear motion to the tools.

The tool-holders $o^4$ $p^4$, pivoted to the tool-carrier $f^4$, will be lifted from the skin during their backward stroke, as and for the purposes described in my patent referred to, the devices herein employed for such purpose being substantially the same as in the said patent. So they need not be herein further described.

When it is desired that the tool-carrier, with the dressing-tools, be moved diagonally across the table, it is necessary to simultaneously move both the carriage on the beam $R'$ and the truck $K$ on its rails. This is accomplished by moving the handle of the guide-lever $F'$ in the direction it is desired the tool-carrier to take, such movement of the said guide-lever simultaneously turning the rock-shafts $G'$ $W'$, causing the bands to rotate such two of the pulleys $A'$, $e^3$, $V$, or $f^3$, hereinbefore described, which it is necessary to rotate to insure the proper direction of movement of the parts. This hand-operated guide-lever $F'$, the position of which determines the direction of movement of the tool-carrier and tools, and the position of the dressing-tools with relation to the skin, greatly simplifies the labor of the attendant, places the machine more perfectly under his control, and consequently enables more and better work to be done.

Pivoted within the trundle-frame $R$ at 24 are toothed levers $q^5$ $r^5$, adapted to be engaged by the vertical-toothed racks $w^5$, guided in grooves $x^5$ in the side pieces of the carriage-head $m^5$, as shown in Figs. 4, 7, and 8. The levers $q^5$ $r^5$ are pivoted at 32 on the sides of the carriage-head, and as they are moved by the racks $w^5$ about the centers 24 lift the carriage-head positively.

Each toothed rack $w^5$ is operated by a bent lever, $y^5$ or $z^5$, which is pivoted at its bend to the carriage-head $m^5$, and has the end of its horizontal arm $a^6$ converted into gear-teeth, which engage similar teeth upon the inside of the said toothed rack, while upon the lower end of its arm $c^6$ is cut a toothed rack, which engages a similar rack cut upon the upper edge of a horizontal slide-bar, $b^{10}$, which is disposed below the lever and slides in suitable ways in the lower cross-beams of the carriage-head, the slide-bar being forced inward or outward by a horizontal screw-shaft, $d^6$ or $e^6$, each of which is mounted in a bearing, $f^6$ or $f^7$, erected upon opposite sides of the annular plate I', and operated by a spur-gear, $g^6$ or $h^6$, secured to its outer end, which engages and is driven by a pinion, $i^6$ or $j^6$, secured to one end of a horizontal shaft, $k^6$, which in turn is mounted in the bearings $f^6$, before named. The shaft $k^6$ (see Figs. 1, 3, and 8) is put in rotation by a bevel-gear, $l^6$, affixed centrally to it, which engages a second bevel-gear, $m^6$, fixed to the rear end of a second horizontal shaft, $n^6$, carrying at its front end a hand-wheel, $o^6$, which extends forward in front of the plate I' of the carriage-head into a position to be readily seized by the attendant. By seizing the hand-wheel $o^6$ and rotating the shaft $n^6$ in one direction the operator is enabled, by rotating the screws $d^6$ $e^6$ and actuating the levers $y^5$ $z^5$, to raise the plate I' of the carriage-head, and with it the tool-carrier and its operating mechanism and dressing-tools with respect to the table, in order to permit of introduction or removal of a skin, or to vary the degree of pressure of the tools upon such skin, while a reverse movement of the hand-wheel and its shaft results in a lowering of the tool-carrier and dressing-tools.

To put the shaft J' in rotation I swivel within the upper part or head, $y^3$, of the trundle-frame of the carriage the hub $w^6$ of a bevel-gear, $v^6$, which incloses the upper end of said shaft, and is connected with it by a spline-and-groove connection, which compels the two to rotate together, but permits the shaft to slide vertically within the hub, the said gear being engaged and driven by a second bevel-gear, $w^6$, secured to the shaft $x^6$, which is disposed in the beam R', parallel with the rock-shafts G' W'. The shaft $x^6$ has bearings $y^6$ $z^6$ erected upon the front and rear ends of the beam R'. The connection between the gear $w^6$ and shaft $x^6$ is a spline and groove, in order that the gear, while rotating with and being driven by the shaft, may slide longitudinally upon the latter by and with the trundle-frame of the carriage in either direction, the gear $w^6$ being connected with the trundle-frame of the carriage by being confined between two uprights, $a^7$ $b^7$, erected thereon.

To the rear end of the shaft $x^6$, I affix a bevel-gear, $c^7$, which engages and is driven by a similar gear, $d^7$, the hub of which incloses the shaft X, before alluded to, and is connected with it by a spline-and-groove connection, $e^7$, the gear and its hub being compelled to slide longitudinally upon the shaft X by uprights $f^7 f^7$, erected upon the extreme upper part of the truck.

To the extreme end of the shaft X, outside of the column V', I secure fast and loose pulleys $g^7$ $h^7$, and operating with these pulleys I employ an endless band leading to a main driving-pulley, a shipper-bar, $i^7$, suitably supported, being employed to ship the belt as occasion requires.

To automatically arrest the traverse in either direction of the carriage upon the beam R', should the attendant fail to do so, I employ a horizontal shipper-rod, $p^6$, arranged parallel to the rocker-shafts G' W', and playing at its rear end in a bearing in the trundle-frame of the carriage, the front end of this shipper-rod being affixed to the upper part of a post, $r$, erected upon the lever E', before named. As the carriage reaches the extreme of its movements or traverses in either direction the rod $p^6$ abuts against the adjacent end bar, $s^6$ or $t^6$, of the beam, and the lever E' is turned upon its fulcrum, thereby rocking the shaft W' and shifting the belt $y$ to the idle-pulley B'.

To provide a shifting or adjustable bearing for the shaft X at points intermediate between the truck and columns Y Y' upon either side of such truck, in instances where a long operating-table is employed, I provide a horizontal slide-bar, $j^7$, which plays in guides or bearings $k^7$ in the upper part of the truck, and is arranged parallel with the shaft X, a standard, $l^7$ or $m^7$, being erected upon each end of this bar and inclosing the shaft. The space between the standards $l^7$ $m^7$ is greater than the width of the truck. Hence when such truck moves in either direction upon its rail it abuts against the standard in front of it and forces it before it, the opposite standard following after and providing a traveling or shifting bearing to support the shaft X.

Having thus explained the nature and operation of my improvements, I claim, and desire to secure by Letters Patent, the following:

1. In a machine for dressing leather, a table or support for the skin and the truck and beam, combined with a carriage composed of a trundle-frame and a vertically-adjustable head therein, adapted to support the guide-rod for the tool-carrier, substantially as and for the purposes described.

2. The truck and its beam, the trundle-frame of the carriage, movable thereon, and the vertically-adjustable head mounted in the trundle-frame, combined with the yoke, its guide-rod, the tool-carrier, and with means to reciprocate the tool-carrier upon its guide-rod while the yoke and guide-rod are locked or held in position.

3. In a leather-dressing machine, the combination of a screw-shaft with and to operate the carriage transversely of the table to effect the traverse of the dressing-tools and their operative devices transversely of the table.

4. The truck and its beam, provided with guides or ways and the carriage fitted thereto, combined with the screw-shaft and means to rotate it, whereby the carriage is moved positively.

5. The skin-supporting table and the truck, combined with a nut and screw to move the truck positively longitudinally of the table, substantially as and for the purposes described.

6. The skin-supporting table, the truck, and nut and screw to move the truck longitudinally of the table, combined with the carriage and a screw to move the carriage transversely of the table, substantially as described.

7. A leather-dressing machine containing the following instrumentalities, viz.: a skin-supporting table, a truck, means to move the truck longitudinally of the table, an independently-movable carriage, which by its change of position places the dressing-tools in the desired position with relation to the table, means to move the said carriage transversely of the table, and a single guide-lever and connections between it and the devices which directly control the movements of the truck and carriage, whereby the said single guide-lever, by moving it more or less in one or the other direction, insures the separate or joint movement of the truck and carriage in either of their directions, substantially as and for the purposes described.

8. In a leather-dressing machine, the skin-supporting table, the truck and the carriage movable thereon, and the shaft $J'$ of the carriage, adapted to impart reciprocating movements to the tool-carrier and dressing-tools, combined with the shaft X and shaft $x^6$, and intermediate gearing to directly and positively drive the said shaft $J'$ in all the positions of the truck and carriage and dressing-tools with relation to the table, substantially as described.

9. In a leather-dressing machine, the trundle-frame of the carriage, combined with the vertically-adjustable head therein, adapted to support the shaft $J'$, and also the yoke and guide-rod for the tool-carrier, substantially as described.

10. In a leather-dressing machine, the truck, the trundle-frame of the carriage, and the vertically-adjustable head therein, combined with the axially-movable yoke and its guide-rod, substantially as described.

11. The skin-supporting table, the truck, the trundle-frame movable on the truck, and the head fitted to move in the trundle-frame, combined with the shaft $n^6$ and intermediate mechanism to adjust the head vertically in the trundle-frame, substantially as and for the purpose described.

12. In a machine for dressing leather, the head of the carriage, the sectoral toothed plates or levers pivoted thereon and connected at their outer ends with the trundle-frame, and the toothed racks $w^5$, combined with the toothed bell-crank levers, and means to operate them simultaneously, substantially as described.

13. The rock-shafts $G'$ $W'$, extended through the beam $B'$, combined with the guide-lever and with connecting mechanism between the said lever and rock-shafts to enable the said lever to turn them in the proper directions to ship the belts, substantially as described.

14. The guide-lever and the rock-shaft $G'$, actuated by it, combined with the belt-shipper $z^2$ and intermediate mechanism, whereby the belt $a^3$ may be shifted to control the movements of the truck in one or the other direction, substantially as described.

15. The guide-lever and the rock-shaft $W'$ actuated by it, combined with the belt-shipper and intermediate mechanism, whereby the belt $y$ may be shifted to control the movement of the carriage transversely of the skin-supporting table, substantially as and for the purpose described.

16. The combination, in a leather-dressing machine, of the beam of the truck, the carriage thereon, the screw-shaft S to move it on the beam, the belt $y$, belt-shipper $d'$, and the fast and loose pulleys with which the said belt co-operates to effect the rotation of the said screw, substantially as described.

17. In a leather-dressing machine, shafts X and $x^6$, located at right angles to each other, combined with intermediate gearing, the reciprocating dressing-tools, the traveling carriage and the pulleys, the truck having beam $B'$, and table, said truck, carriage, and tools being operated by the rotation of the said shafts, substantially as described.

18. In a leather-dressing machine, the pulleys $A'$ $B'$ $V$ $b^3$ $e^3$ $f^3$, the belts $y$ and $a^3$, the stop-rod $c'$, and shipper-arm $z^2$, the latter guiding the belt $a^3$ and being secured to and moving with the rod, substantially as described.

19. In combination, the rod $c'$, shipper-arms $d'$ $z^2$, toothed bars $f'$ $k^2$, and rock-shafts $W'$ $G'$, with suitable intermediate mechanism, whereby the rocking of either shaft tends to move the shipper-arms in one or the other direction, substantially as described.

20. The combination, in a leather-dressing machine, of the truck and beam, the carriage, and driving-shaft X, pulleys W and $H'$, the rock-shafts $G'$ $W'$, and suitable intermediate mechanism, whereby the continuous rotation of the said pulleys in one direction effects the rotation in either direction of the devices which engage and move the truck on its rails and the carriage on the truck, substantially as described.

21. The combination of the rock-shaft $W'$ and screw-shaft S, the truck, its beam, and the trundle-frame of the carriage, combined with intermediate mechanism, whereby the said screw-shaft is rotated to move the trundle-frame upon the truck, and the rock-shaft is enabled to control the rotations of the said screw-shaft, substantially as described.

22. In combination, the truck and its beam, the carriage, the rock-shafts $G'$ $W'$, the screw-shaft S and screw-rod $s^3$, nut $r^3$, the guide-lever $F'$, and suitable connecting mechanism, whereby said guide-lever controls the rotation of the shaft S and nut $r^3$, and of the movements of the truck and of the carriage on the truck, substantially as described.

23. The rock-shaft $W'$ and connected lever $E'$, and the carriage, combined with the shipper-rod $p^6$, connected with the said lever, whereby as the rod $p^6$ is moved in the carriage as the latter reaches its extreme positions the belt-shipper $d'$ is moved to ship the belt $y$ upon the loose pulley $B'$ and stop the movement of the carriage, substantially as described.

24. In a leather-dressing machine, the truck, the loosely-held stop-motion rod $c'$, and its connected arm $z^2$, whereby as the rod $c'$ is moved on the truck as the latter reaches its extreme positions the said arm $z^2$ moves the belt $a^3$ upon the idle-pulley $b^3$ and stops the movement of the truck, substantially as described.

In testimony whereof I affix my signature in presence of two witnesses.

FREDERIC A. LOCKWOOD.

Witnesses:
    H. E. LODGE,
    WM. T. ANDREWS.